Aug. 26, 1952 D. G. ROOS 2,608,273
LUBRICATION SYSTEM AND APPARATUS
Filed Feb. 18, 1947 3 Sheets-Sheet 1
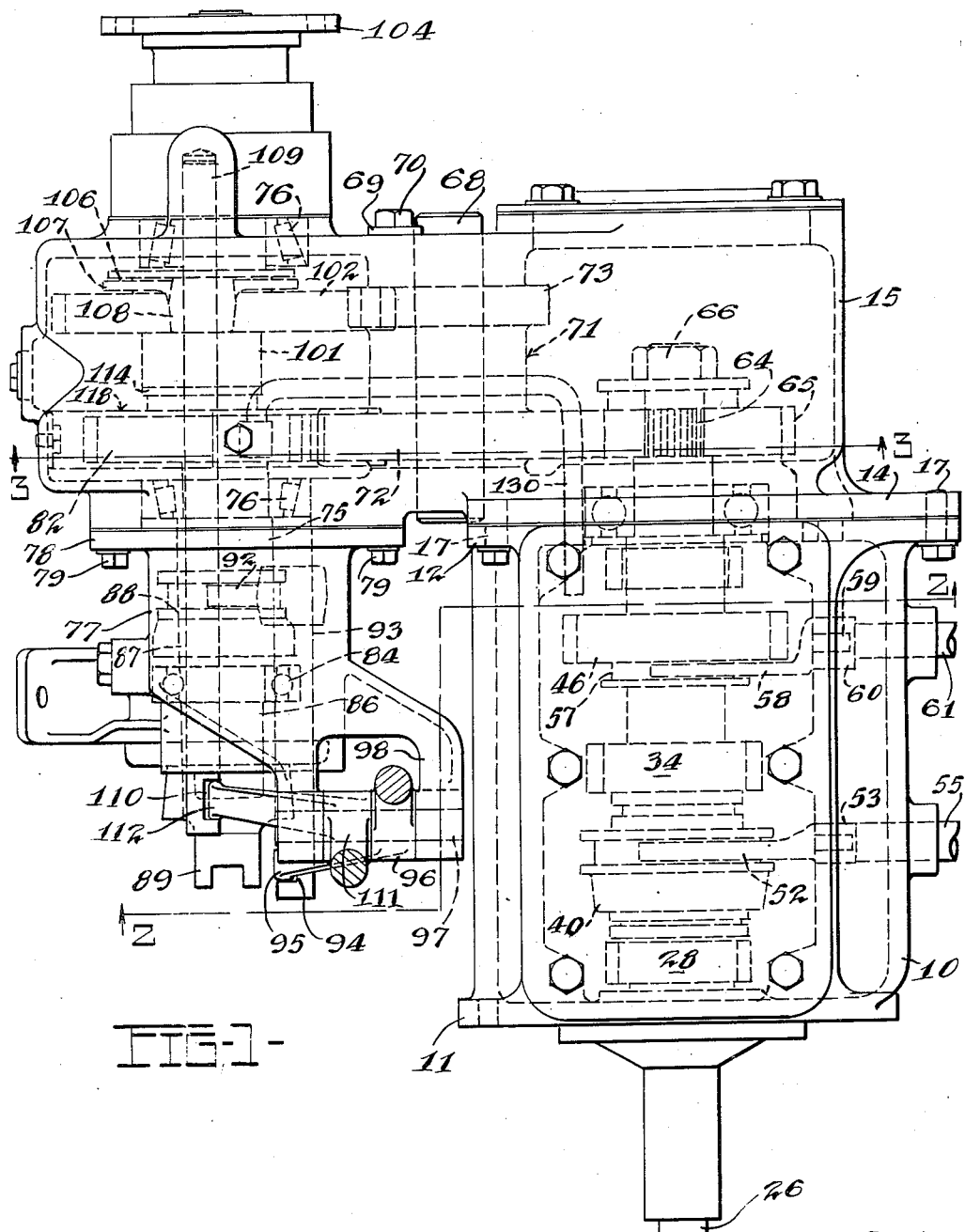
FIG-1-
Inventor
Delmar G. Roos
By
Attorney

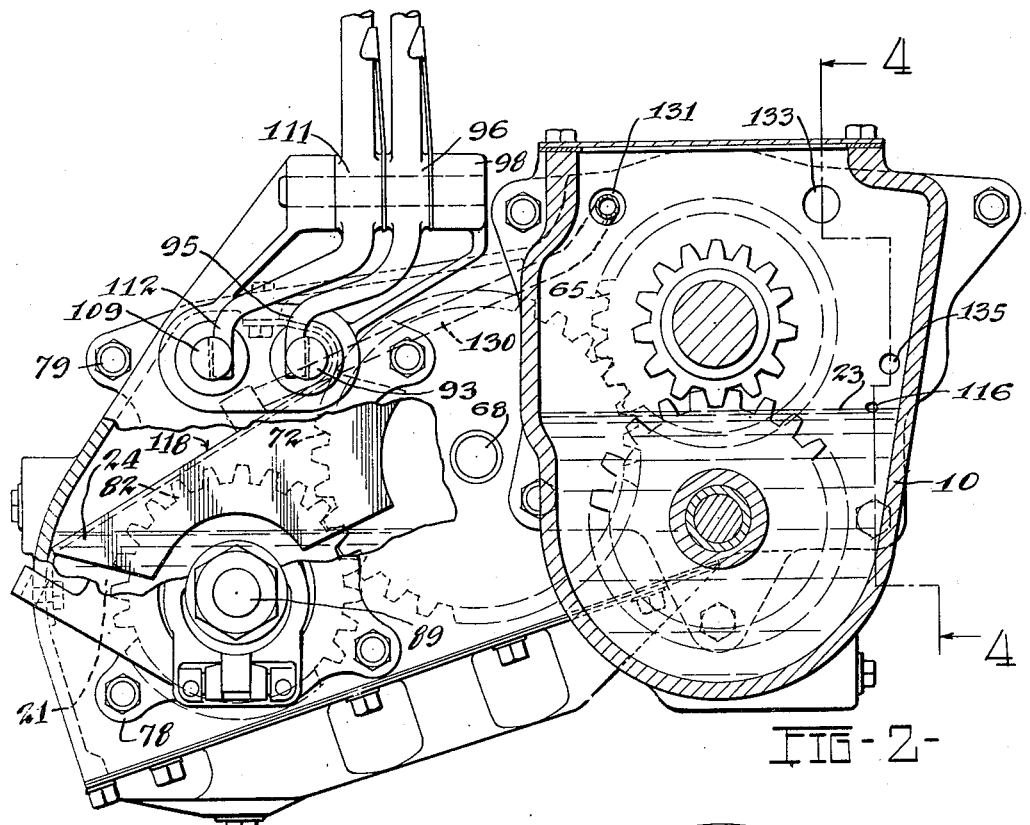
FIG-2-
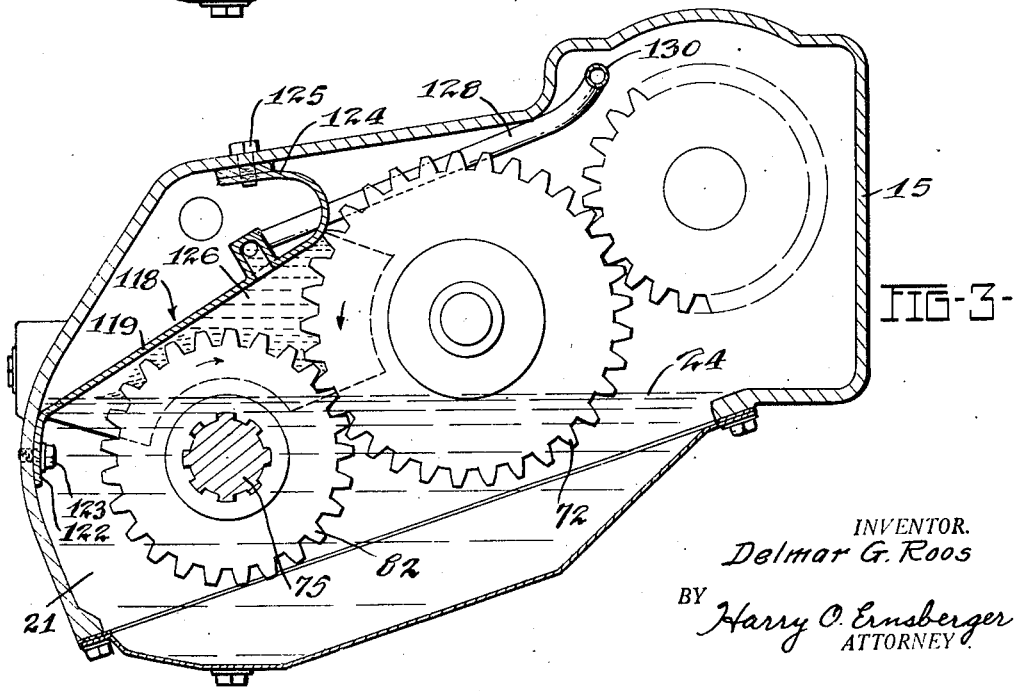
FIG-3-
INVENTOR.
Delmar G. Roos
BY Harry O. Ernsberger
ATTORNEY.

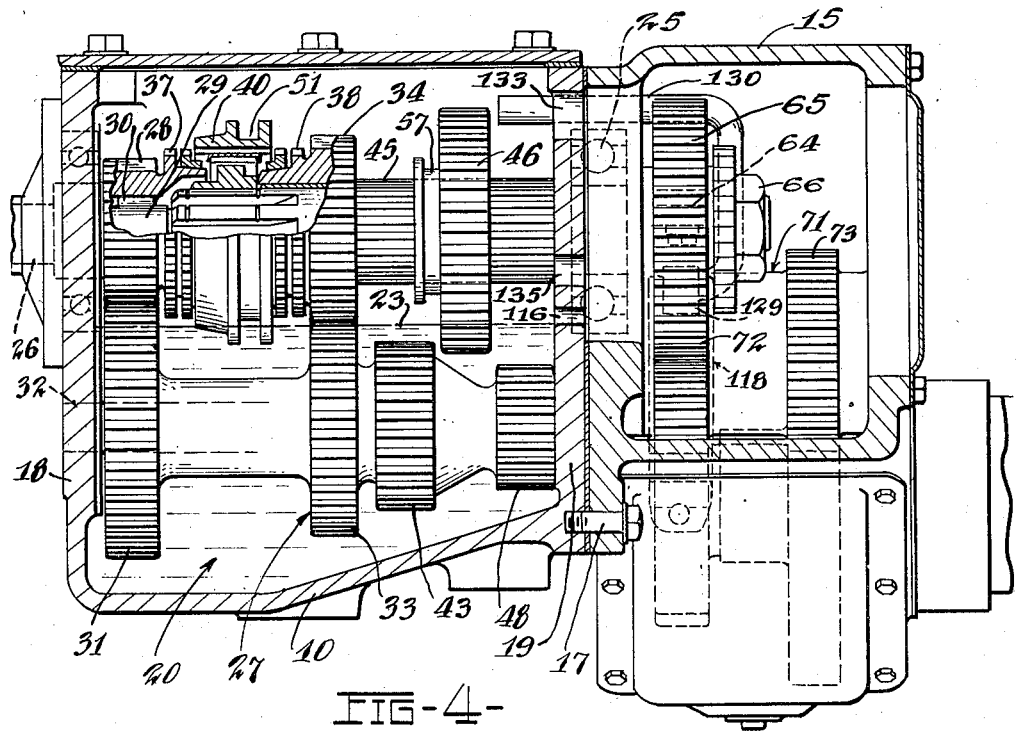
FIG-4-
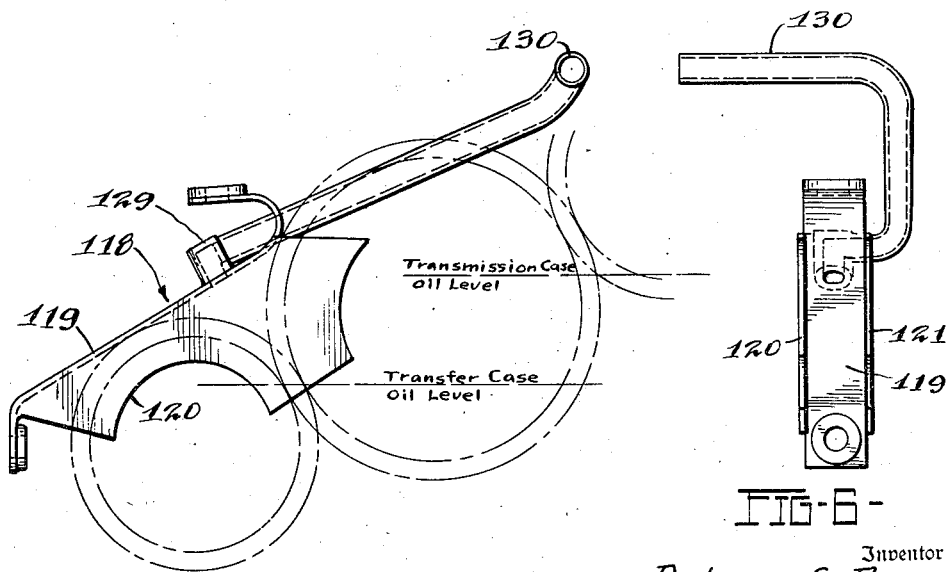
FIG-5-
FIG-6-
Inventor
Delmar G. Roos
By
Harry O. Ernsberger
Attorney Patented Aug. 26, 1952

2,608,273

UNITED STATES PATENT OFFICE 2,608,273

LUBRICATION SYSTEM AND APPARATUS

Delmar G. Roos, Toledo, Ohio, assignor to Willys-Overland Motors, Inc., Toledo, Ohio, a corporation of Delaware Application February 18, 1947, Serial No. 729,223

3 Claims. (Cl. 184—11)

This invention relates to lubrication systems and apparatus and more especially to a method and means for lubricating mechanisms contained within separate housings wherein a supply of lubricant is maintained in both housings. In the mechanical organization of certain types of automotive vehicles and more especially those vehicles powered by internal combustion engines and utilizing change speed gearing for conveying power to the drive wheels, the usual change-speed gearing being supplemented by mechanism or gearing contained in an independent housing or casing for obtaining additional reduction in or drive ratio between the engine and driven road wheels. Constructions of this nature are utilized for heavy duty trucks and four wheel drive vehicles wherein exceptionally low reduction in drive ratio is imperative or desirable. The housings containing the main change-speed gearing and the supplemental gearing are usually disposed adjacent each other, and each housing contains a supply of lubricant which for satisfactory operation of the gearing must be maintained at a pre-determined heighth or level in each housing. In many change-speed gear arrangements of this nature, the gearing is so arranged that the lubricant levels in the respective gear housings must be maintained at different heighths in order to provide satisfactory lubrication. In constructions of this nature, difficulties have been encountered in maintaining differential levels of lubricant in the housings as lubricant seeps or flows by gravity through the journals or bearings from the transmission having the higher level of lubricant into the other housing. Thus after a period of time, the levels of lubricant in two housings would tend to become equalized which would result in insufficient lubricant for one set of change-speed gearing and an over supply of lubricant for the other set of gearing.

One of the objects of this invention is the maintenance of different levels of lubricant in adjacent chambers or housings.

Another object of the invention resides in the provision of a passage associated with gearing contained in one housing for replenishing the supply of lubricant in an adjacent housing.

Another object of the invention resides in a method of transferring lubricant from one housing to another wherein the arrangement of gearing in one housing is disposed in cooperative association with a lubricant conveying duct or passage in such a manner that the rotation of the gearing transfers the lubricant to the housing having a higher lubricant level in conjunction with means to predetermine the level of lubricant in the housing having the higher lubricant level.

Another object of the invention resides in the provision of venting means establishing communication between adjacent housings or chambers wherein a transfer of liquid is being effected, said venting means providing for the equalization of pressures in said housings.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a top plan view of main and supplementary transmission mechanisms for an automotive vehicle showing the arrangement and association in assembled relationship;

Figure 2 is a partial vertical sectional view taken substantially on the line 2—2 of Figure 1 with part of a housing wall broken away;

Figure 3 is a transverse vertical sectional view taken substantially on the line 3—3 of Figure 1;

Figure 4 is a vertical longitudinal sectional view taken substantially on the line 4—4 of Figure 2;

Figure 5 is an elevational view illustrating one form of fluid conveying passage or duct, and Figure 6 is an end view of the arrangement disclosed in Figure 5.

While I have illustrated an arrangement of method and apparatus of my invention as applied to and incorporated in transmission gearing for automotive vehicles and especially trucks or four wheel drive vehicles wherein extremely low gear reduction is desirable, it is to be understood that the system and apparatus of my invention may be utilized with any mechanisms wherein it is desirable or essential to maintain different levels of fluid in adjacent housings or chambers.

Referring to the drawings in detail, I have illustrated one form of the lubricating system and apparatus as embodied in power transmission gearing mechanisms especially adapted for securing comparatively low gear reductions for the drive road wheels of a four wheel drive wherein the transmission of power may be established to both front and rear wheels. In the embodiment illustrated, there is provided a main housing 10 enclosing the main transmission gearing, the housing 10 having at its forward end a flange 11 adapted to be secured to a clutch housing (not shown) the clutch mechanism being adapted to transmit power from an internal combustion engine or other source of power (not shown). The housing 10 is provided at its rear portion with a similar flange 12 which mates with a flange 14 formed integrally on a supplemental transmission housing or chamber 15. The main and supplemental housings are fixedly secured in adjacent relation by suitable securing means, for example, bolts 17. The supplemental housing 15 encloses and supports auxiliary or supplemental transmission gearing for securing drive ratios in addition to those that may be attained through the sole use of the main transmission gearing contained in the housing 10. The supplemental housing 15 and the mechanism contained therein forms an auxiliary unit which is sometimes referred to as a transfer case.

The transmission housing 10 is provided with a forward wall 18 and a rear wall 19 which form a chamber arranged to contain a supply of lubricant indicated at 20, the wall 19 separating the main transmission housing 10 from the supplemental housing 15. The supplemental housing or transfer case unit 15 is also arranged to contain a supply of lubricant indicated at 21 the level of which is normally lower than the level of lubricant contained in the main transmission housing 10. The normal level of lubricant in the main transmission housing is indicated at 23 while the normal level of lubricant in the supplemental housing is indicated at 24, as shown in Figures 2, 3 and 4.

The vehicle engine or other source of power is connected through suitable clutch mechanism (not shown) with a shaft 26 which extends within the main transmission housing 10 and is integrally formed with a gear 28. The interior of the gear portion 28 formed on the shaft is provided with a chamber to receive the forward extremity of a driven shaft 29, the portion of the shaft extending into the chamber being mounted in needle bearings 30, while the rear portion of shaft 29 is journaled in a suitable anti-friction or ball bearing 25.

The gear 28 is in mesh with a driven gear 31, the latter forming a part of a reduction gear cluster unit 27 which is journaled for rotation upon a supplemental shaft 32. The gear 31 is of larger diameter than the gear 28 so that the cluster gear unit rotates at a lower speed than that of gear 28 and shaft 26. The cluster gear unit 27 is inclusive of a gear 33 which is in constant mesh with a gear 34, the latter being journaled for independent rotation upon an intermediate portion of shaft 29. The portion of shaft 26 adjacent gear 28 is formed with a toothed portion 37 and the gear 34 is integrally formed with a similarly shaped toothed portion 38. Normally disposed between the toothed portions 37 and 38 is a longitudinally slidable dental clutch member 40 which is adapted to be selectively connected with either of the toothed portions 37 and 38 for establishing a drive connection on the shaft 29. Thus, when the dental clutch member 40 is moved to the left as viewed in Figure 4, the internal teeth (not shown) formed upon member 40 interengage with teeth 37 to establish a direct drive connection from shaft 26 to shaft 29. When the dental clutch member 40 is shifted to its extreme right position to bring the teeth thereof into engagement with the teeth 38 formed on one side of gear 34, a drive is established to shaft 29 through gears 28, 31, 33 and 34. In this latter manner, a drive established to shaft 29 is at a lower speed than that of shaft 26 through the medium of the gearing above mentioned, which is conventionally known as "second speed drive." A gear synchronizer for facilitating interenmeshment or engagement of the teeth on dental clutch 40 with either of the toothed portions 37 and 38 is associated with the dental clutch 40. This synchronizer device is of conventional type and is not therefore shown in detail in the drawings.

Also integrally formed with cluster gear unit 27 is a comparatively small diameter gear 43. The shaft 29 is formed with a splined portion 45 upon which is slidably mounted a gear 46. When the gear 46 is moved toward a left hand direction as viewed in Figure 4 to bring the teeth thereof into enmeshment with the teeth of gear 43, a drive is established through gears 28, 31, 43 and 46 to the shaft 29, which provides the so-called conventional "low speed drive." The cluster gear 27 is also formed with a comparatively small diameter gear 48 which meshes with an idler gear (not shown) journaled upon a suitable stub shaft (not shown) disposed within the transmission housing 10. When gear 46 is moved to an extreme right hand position as viewed in Figure 4, the gear 46 enmeshes with the idler gear (not shown) to establish a drive for shaft 29 in a reverse direction of rotation with respect to the drive shaft 26.

Means are provided for moving the dental clutch member 40 and gear 46 for the purposes of effecting changes in gear ratios. The dental clutch member 40 is formed with an annular recess 51 into which projects a bifurcated or forked shifter element 52 having a tenon portion mounted in a boss 53. The boss or member 53 is mounted upon a shaft 55 which extends interiorly of the housing and is adapted to be rotated by suitable control means (not shown) to shift the dental clutch member 40 to its selected positions. The gear construction 46 is formed at one side with an annular recess 57 which is adapted to receive and accommodate a forked or bifurcated gear shifting member 58 the latter being provided with a tenon 59 mounted in a member 60. The member 60 is associated with a shaft 61 which extends exteriorly of the housing 10 and is adapted to be rotated by suitable control means (not shown) to shift the position of gear 46 to obtain low gear ratio and reverse gear drive in a conventional manner.

The shaft 29 has a portion 64 extending beyond the bearing 25 into the supplemental housing or transfer case 15. The portion 64 of the shaft 29 is splined to receive a spur gear 65 adapted to be driven and rotated by the shaft. The gear 64 is held in place on the shaft by means of a securing nut 66. Extending across the supplemental housing 15 is an intermediate or layshaft 68 which is secured in fixed position by means of a locking plate 69 and a securing screw 70 as shown in Figure 1. Journaled upon the layshaft 68 is a gear cluster 71 which includes in integral formation a gear 72 in mesh with the teeth of gear 65, the cluster including a second gear 73 which is of lesser diameter than gear 72. Also disposed within the supplemental housing 15 is a shaft 75 which is journaled in suitable antifriction bearings 76 preferably of the tapered roller type mounted in a wall of the supplemental housing 15 as shown in Figure 1. The member 77 extending forwardly of the housing 15 is formed with a flange 78 which mates with a suitable boss portion on the housing 15 and is secured thereto by means of securing bolts 79. A gear 82 is journaled for rotation on shaft 75 and is in constant mesh with intermediate gear 72. It should be noted that gears 65, 72 and 82 are always in mesh and whenever shaft 29 is rotated these gears are also rotated by the shaft. Journaled on suitable ball bearings 84 and arranged in axial alignment with shaft 75 is a stub shaft 86 which is formed with a toothed portion 87 which is adapted to be engaged with a dental clutch portion 88 for connecting the stub shaft 86 to the shaft 75. Mounted upon the stub shaft 86 is a coupling member 89 which is adapted to be connected to another coupling member and mechanism (not shown) for establishing a drive connection to the front wheels of the vehicle.

Means are provided for shifting the dental clutch member 88 for establishing a drive to the front wheels. To this end the dental clutch member 88 is provided with an annular recess into which projects a clutch shifting fork or element 92 which is suitably supported upon a rod or shaft 93 arranged for slidable movement in a direction axially of shaft 75. The shaft 93 projects exteriorly of member or extension 77 and is formed with a rectangular notch or recess 94 adapted to receive a projection or finger 95 integrally formed as a part of a control lever 96 for actuating rod 93 and shift fork 92 to establish or disestablish a drive connection through the transmission gearing to the front wheels. The lever 96 is pivotally supported upon a shaft 97 which is carried in a forwardly extending bracket portion 98 integrally formed upon the member 77.

The shaft 75 is provided with a splined portion 101 upon which is slidably mounted gear 102 which is of a larger diameter than gear 73 and which is adapted to be engaged with gear 73 through longitudinal movement on the splined portion 101 of shaft 75.

The shaft 75 extends rearwardly of the transfer case or housing 15 and supports an element 104 forming part of a coupling which is connected to a drive shaft (not shown) for transmitting power through the transmission gearing and transfer case mechanism to the rear wheels of the vehicle.

Means are provided for shifting the gear 102 along the splined portion 101 of shaft 75 so as to provide for a variation in ratio of power transmission to the vehicle wheels. To this end, gear 102 is provided with a laterally extending portion formed with an annular recess 106 into which extends a bifurcated member 107 formed with a boss portion 108. The boss portion 108 is bored to be received or mounted upon a shaft 109, the latter being arranged for longitudinal slidable movement parallel with the axis of shaft 75. The rod or shaft 109 projects forwardly of member 77 and is provided with a kerf or recess 110. Mounted upon shaft 97 is a lever 111 having a depending portion 112 fitting into the recess or kerf 110 in shaft 109. Thus by pivotal movement of lever 110 about the axis of shaft 97, the rod 109 may be moved longitudinally to shift the position of gear 102.

When the gear 102 is in mesh with gear 73 as shown in Figure 1, a low gear ratio is established for the transmission of power through the transfer case gearing to the shaft 75 and thence to the vehicle wheels. The standard ratios of power transmission obtainable by the gearing contained in the main transmission housing 10 may be transmitted through shaft 75 to the vehicle wheels by moving the gear 102 along the splined portion 101 until dental clutch teeth or internal teeth formed on gear 102 take over or engage dental clutch teeth 114 formed on gear 82. In this position the shaft 75 is connected through the splines 101 and the dental clutch teeth 104 in engagement with gear 102 to transmit power from the transmission shaft 29 to the vehicle wheels without variation in speed ratio by reason of the gearing contained in the supplemental or transfer gear housing 15.

As will be obvious from Figures 2 and 3, the level of lubricant indicated at 23 in the main transmission housing 10 is above the level of the lubricant contained in the supplemental or transfer gear housing 15, the level of lubricant in the latter being indicated at 24. The present invention includes a method and means for maintaining the proper lubricant levels in the main and supplemental transmission housings. In the embodiment of the invention illustrated in the drawings, the lubricant level in the main transmission housing 10 is above the level of lubricant in the supplemental housing 15, and in order to maintain the lubricant at the higher level in one of the housings, its supply is replenished by conveying lubricant from the supply of the lower level. The lubricant supply at the higher lever is maintained at such level through the provision of a passage or duct 116 for permitting flow of lubricant from housing 10 into housing 15 when the level of lubricant in housing 10 rises above the duct or opening 116.

The arrangement or method of conveying lubricant from the lower level supply to the higher level lubricant supply is accomplished through the pumping action of the rotating gearing contained in the transfer case in collaboration with a lubricant conveying channel or passage establishing communication between housings 10 and 15.

One embodiment of the lubricant conveying means is illustrated in Figures 3, 5 and 6. In this form, a shroud or lubricant guide 118 is formed with an upper wall 119 and side wall portions 120 and 121, the latter being astraddle upper portions of gears 72 and 82 as more particularly shown in Figure 3. The wall portion 119 terminates at its lower end in a lip 122 adapted to be secured to the wall of the transfer case or supplemental housing 15 by means of a bolt 123, while the upper extremity of wall 119 terminates in a portion 124 which is secured to the transfer case or housing by means of a bolt 125. The upper wall portion 119 and side portions 120 and 121 of the shroud form a lubricant collecting zone 126 the lubricant being moved to this zone by the rotational movement of gears 72 and 82 in cooperation with the lubricant guide 118. A tube or passage 128 establishes communication between the main and supplemental housings so that lubricant is conveyed from one housing to the other. As shown in Figures 3, 5 and 6 this lubricant conveying means is in the form of a tube 128 which is joined with a fitting 129 formed on the shroud 118, the upper end 130 of the tube being configured to project through an opening 131, which also forms a suitable vent between the main and supplemental transmission housings to facilitate the equalization of atmospheric pressure between the housings. Other venting means may be provided in the form of an opening 133, if desired. From examination of Figure 3 it will be seen that rotation of gears 72 and 82 in the directions indicated by the arrows moves lubricant to the zone 126, the gear teeth acting as a pumping medium forces lubricant through the passage 128 from the lubricant supply in the transfer case 15 into the main transmission housing 10 so as to provide a means for replenishing the lubricant at the higher level in housing 10 whenever the transmission is in operation.

As illustrated in Figure 4 there is an opening 135 disposed adjacent and above the channel or opening 116 and of larger diameter. It has been found under certain conditions that considerable "froth" of the lubricant may be set up in the transmission housing 10 by reason of the rapid rotation of the gearing and the larger opening 135 is for the purpose of facilitating rapid disposition of frothing lubricant to move from the main transmission housing 10 into the transfer case 15. By this means the actual level of lubricant in housing 10 is prevented from rising to an undue level which may occur under the continuous flow of lubricant through channel 128 from the lubricant supply in the transfer case 15 during operation of the mechanism. If too much lubricant flows from housing 15 into housing 10, the lubricant level in the supplemental housing or transfer case 15 may be lowered so that insufficient lubrication of the gearing in housing 15 might result. The larger opening 135 eliminates the possibility of an excessive rise of lubricant level in the main transmission housing.

While I have illustrated one embodiment of method and apparatus for conveying lubricant from one housing to another, it is to be understood that I do not wish my invention to be limited to the specific disclosure, but that I contemplate broadly the method of utilizing the pumping action of rotating gearing in one housing in collaboration with a lubricant transferring channel or passage leading to another housing from a zone in which lubricant is conveyed by gearing so as to establish a flow of lubricant from one housing to another. It will be seen that through the arrangement of my invention lubricant may be conveyed from a source of supply in one housing at one lubricant level to an adjacent housing in which lubricant is maintained at a different level and adequate lubrication of mechanism in both housings is obtained without the utilization of extraneous lubricant pumps and the like. Furthermore the arrangement of vent opening and lubricant passages provide for the maintenance of the proper level of lubricant in both housings and for equalization of pressure within the housings.

It is apparent that, within the scope of the invention, modifications and different arrangements may be made other than is herein disclosed and the present disclosure is illustrative merely, the invention comprehending all variations thereof.

What I claim is:

1. In combination, a main housing adapted to enclose mechanism including change speed gearing for an automotive vehicle; a supplemental casing secured to said main housing; one of said housings having a wall forming a partition between said housings; supplemental change speed mechanism contained in the supplemental housing and including a pair of interenmeshing gears driven by mechanism contained in said main housing; each of said housings adapted to contain liquid lubricant; a passage between said housings through which liquid lubricant may be transferred from the supplemental to the main housing; means partially surrounding the pair of interenmeshing gears in said supplemental housing forming a chamber adapted to be filled with liquid lubricant by rotation of said pair of gears from the supply of lubricant in the supplemental housing, said chamber being in communication with said passage for directing flow of lubricant therethrough by pumping pressure set up by said pair of rotating gears, and a second passage in said partition spaced from said first mentioned passage through which lubricant may flow by gravity from said main housing to said supplemental housing for determining the lubricant level in said main housing.

2. A system for lubricating power transmission mechanism including a main transmission housing; a supplemental transmission housing secured to said main housing and including a wall disposed between said main and supplemental housing; power transmission mechanism contained in each of said housings; the power transmission mechanism in said supplemental housing including a pair of interenmeshing gears; both of said housings adapted to contain a supply of liquid lubricant; a lubricant passage formed in the wall between said housings for predetermining the lubricant level in said main housing at a higher level than that in the supplemental housing; a shroud positioned adjacent and partially surrounding the pair of interenmeshing gears in said supplemental housing; a lubricant conveying duct connecting said shroud with said main housing; said pair of gears being adapted for rotation in a direction to direct liquid lubricant from the supply in said supplemental housing through said duct to said main housing, and an air vent opening formed in the wall between said housings for equalizing the air pressure in said housings.

3. A lubricant system for power transmission gearing including a main housing; a supplemental housing secured thereto; one of said housings having a wall disposed between the housings; power transmission mechanism contained in said housings, the power transmission mechanism in said supplemental housing including a pair of interenmeshing gears driven by the power transmission mechanism contained in said main housing; each of said housings adapted to contain a supply of liquid lubricant normally at respectively different levels in said housings; said wall being formed with a passage whereby lubricant may flow by gravity from said main housing to the supplemental housing to establish the lubricant level in said main housing; a second lubricant passage of larger dimension formed in the wall between said housings and disposed at a higher level than the first mentioned passage; means partially enclosing the pair of interenmeshing gears in said supplemental housing forming a chamber in which lubricant is delivered by said gears during rotation thereof, and a third passage arranged between the chamber formed by said gear enclosing means and the main housing whereby the rotation of the pair of gears directs lubricant from said chamber through said third mentioned passage to the main housing from the lubricant supply in the supplemental housing.

DELMAR G. ROOS.

REFERENCES CITED

The following references are of record in the file of this patent:

UNITED STATES PATENTS

| Number | Name | Date |
|---|---|---|
| 1,045,751 | Salenius | Nov. 26, 1912 |
| 1,246,236 | Cooper | Nov. 13, 1917 |
| 1,268,897 | Tresslar | June 11, 1918 |
| 1,436,913 | Seaholm | Nov. 28, 1922 |
| 1,459,815 | Belden | June 26, 1923 |
| 1,720,988 | Ahlm | July 16, 1929 |
| 1,858,533 | White | May 17, 1932 |
| 1,900,735 | Pomeroy | Mar. 7, 1935 |
| 2,027,012 | Barnes | Jan. 7, 1936 |
| 2,244,225 | Strehlow | June 3, 1941 |